United States Patent [19]
Abele et al.

[11] 4,322,974
[45] Apr. 6, 1982

[54] ULTRASOUND SCANNER

[75] Inventors: Manlio Abele, Garden City, N.Y.; Anthony M. Passalaqua, Glenridge, N.J.; Norman E. Chase, Yonkers, N.Y.

[73] Assignee: New York University, New York, N.Y.

[21] Appl. No.: 118,866

[22] Filed: Feb. 5, 1980

[51] Int. Cl.³ ............................................. G01N 29/04
[52] U.S. Cl. ......................................... 73/602; 73/607; 128/660
[58] Field of Search ................... 73/602, 606, 607, 620, 73/628, 629, 624; 128/660

[56] References Cited

U.S. PATENT DOCUMENTS

| | | | |
|---|---|---|---|
| 3,156,110 | 11/1964 | Clynes | 73/628 |
| 3,756,071 | 9/1973 | Dory | 73/602 |
| 3,805,596 | 4/1974 | Klahr | 73/602 |
| 4,105,018 | 8/1978 | Greenleaf et al. | 73/602 |
| 4,174,635 | 11/1979 | Oldendorf | 73/606 |

*Primary Examiner*—Stephen A. Kreitman
*Attorney, Agent, or Firm*—Daniel M. Rosen

[57] ABSTRACT

An ultrasound scanner for scanning a medium for anomalies scattering acoustic waves, having ultrasonic transducing means positioned within scanning range of the medium; ultrasonic transmitting means coupled to the transducing means for providing a train of pulsed ultrasonic carrier signals. Each pulsed carrier signal of the train has a constant and unique frequency, the train of pulsed carrier signals together covering a range of frequencies. The transducing means is oriented to propagate the train along a path through the medium. The device further includes (a) means for repeatedly repositioning the transducing means for propagating further trains along a plurality of different paths through the medium, the plurality of different paths together defining a planar cross-section; (b) means coupled to the transducing means and responsive to the steady state phase and amplitude of the received signal to thereby define the total scatter characteristic within the planar cross-section; (c) means for calculating from the characteristic plurality of point characteristics of the acoustic property corresponding to the scatter characteristic; and (d) means for comparing each of the point characteristics with respect to one another for the anomalies.

14 Claims, 12 Drawing Figures

ULTRASOUND SCANNER

The present invention relates to ultrasonic imaging and more particularly to an ultrasonic diagnostic technique employing high resolution data collection capability.

The examination of human tissue by penetrating radiation has become a conventional technique for the detection of anomalies in an otherwise uniform background. It is particularly desirable in performing such scans to utilize acoustic waves, particularly in the ultrasonic frequency range, approximately 50,000 cycles per second and higher, or those in the supersonic range, with a frequency scale as low as 15,000 cycles per second. Such acoustic waves can propagate in solids and liquids and are known to be partially reflected and partially transmitted at any interface between two media of different acoustic properties. It is also well known that the product of material density and acoustic wave velocity is the acoustic impedance, whose change from one medium to interfacing medium determines the fraction of acoustic radiation which is reflected when impinging upon the surface. Pulses of acoustic waves are often used for echo ranging of distances from an interface by measuring the time interval from initiation of the pulse to the return of the echo of the acoustic source. Thus, by using suitable scanning procedures and transducer arrays, one can image the position of objects and outline the interfaces which scatter and reflect the transmitted burst of energy. It has been found, however, that the information contained in such an image is not a quantitative presentation of some physical properties of the medium because it also depends on the gradients across tissue interfaces and their orientation relative to the propagating ultrasound beam.

Various techniques have been utilized for providing high resolution in ultrasonic imaging. For example, in U.S. Pat. No. 3,805,596, a complete description of ultrasonic image scanning techniques as set forth, wherein a sequence of phase coherent ultrasonic pulse signals are produced from a set of transducer positions. The reflected pulse signals are detected and mathematically processed with specified filter functions to produce a processed signal time function from which a high resolution image of the reflecting bodies can be produced. In the technique set forth in the aforementioned patent, however, as in all other prior techniques utilizing ultrasound imaging, the concept of pulse burst transmission and two-dimensional convolutional processing is well established. Any improvement of resolution utilizing these concepts relies specifically on the ability of data processing equipment to process data received in accordance with the diffraction of scattered waves by anomalies in otherwise uniform background media.

It is the object therefore of the present invention to provide a novel and unique ultrasonic imaging method and apparatus which will provide improved resolution by means of increasing the quantitative presentation of physical data derived from the ultrasound scan.

The foregoing object of the present invention is achieved by interrogating the target under scrutiny with a sequence of long rectangular pulses, each of assigned frequency rather than a single short burst of one frequency in a manner such that the ultrasound wave covers the entire region under scrutiny over a range of frequencies. More particularly, at each position of the transducer a sequence of pulses of different carrier frequencies covering a prescribed frequency range is generated. Amplitude and phase measurements are performed over the full frequency range and from such data a series of integrals of acoustic properties over equal phase layers are derived. These integrals contribute to the total scatter of a region under consideration. The scan process is repeated for a plurality of orientations of the transducer in such a way that at each point under scrutiny the integrals of acoustic properties over equal phase layers for all possible orientations are obtained. A three-dimensional convolution procedure then extracts from this information the local values of acoustic properties contributing to the scattering process. The local values of acoustic properties may then be displayed in accordance with conventional standard display techniques for subsequent utilization. In this manner, a computerized imaging technique which involves both a frequency scanning as well as a mechanical scanning and data reduction system implement an image reconstruction. The foregoing technique is applicable to soft tissue areas, and in particular to breast scanning.

The application of suitable software techniques may be applied for the detection of anomalies along individual scan lines since a plurality of scans at different frequencies are provided along lines of similar transducer orientation.

The foregoing general description of the present invention will become more apparent from the following more detailed description and appended drawings, wherein.

Figure 5:
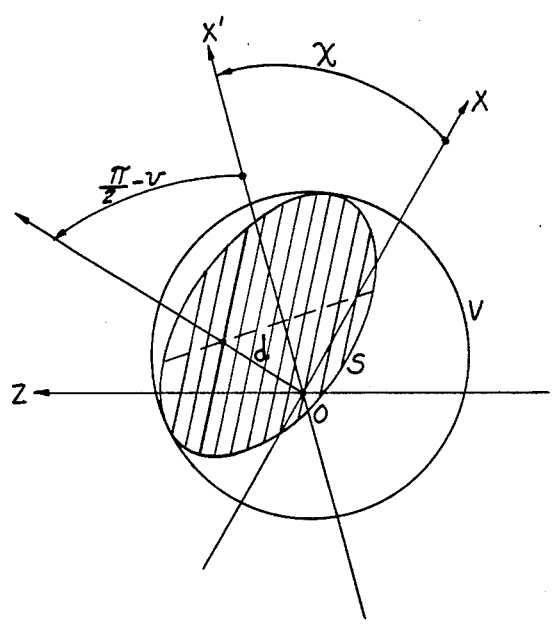
Figure 6:
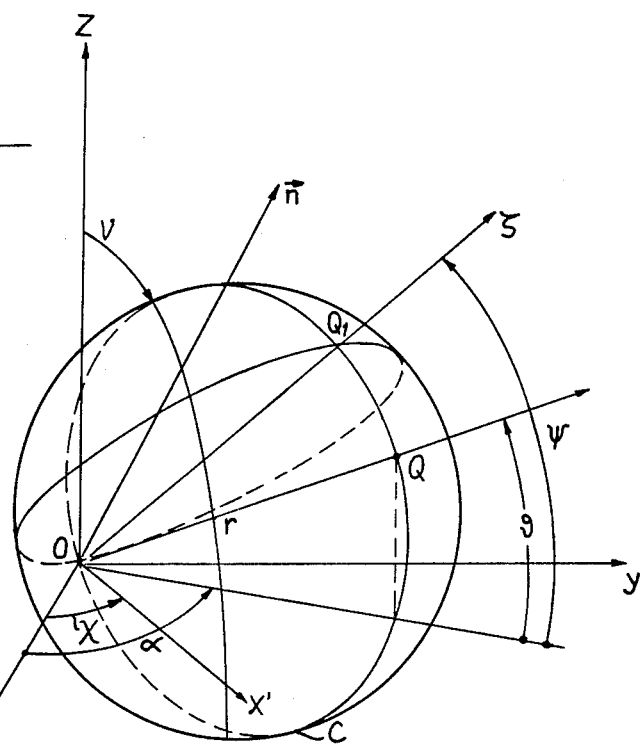
Figure 7:
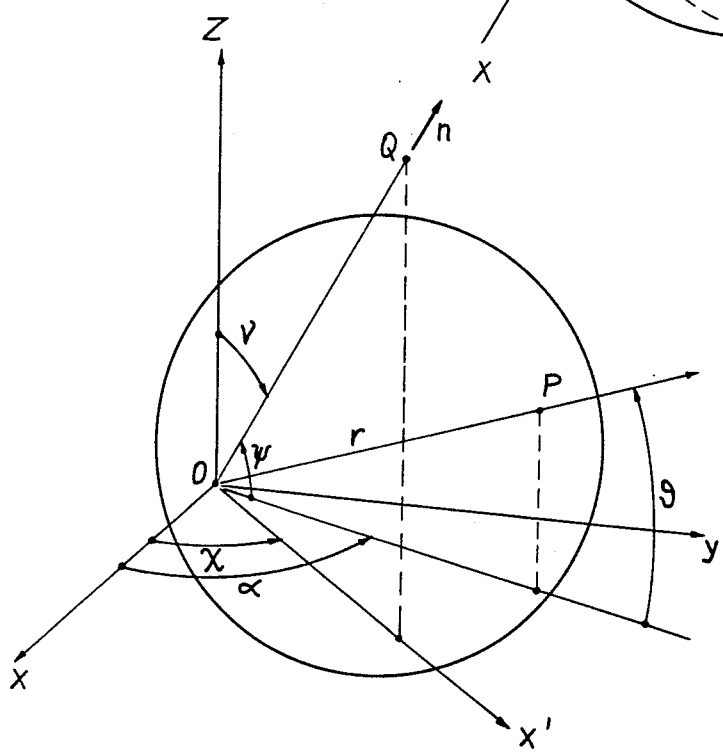

FIGS. 5, 6, and 7 are more specific diagrams illustrating the derivation of phase and frequency characteristics from the derived data.

Figure 1:
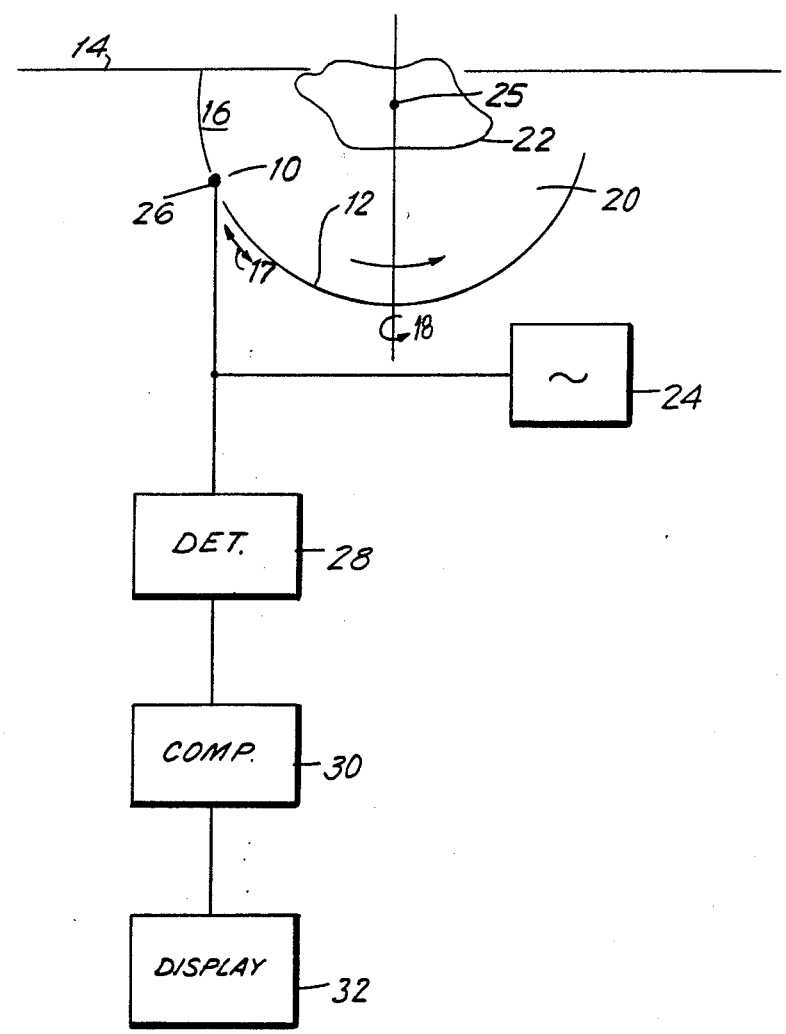
FIG. 1 is a general block diagram of the logical operation of the present invention.

With reference to FIG. 1, an apparatus embodying the basic structural principle of this invention is shown. As ultrasonic transducer 10 is mounted on a track 12, affixed with respect to a frame 14 for accommodating a general medium 16 to be scanned. The transducer mounting is adapted for both orbital motion 17 as well as rotational motion 18 within a homogeneous medium 20 including an area 22 to be scanned. The motion results in a scan over a plurality of angular orientations through the medium. The transducer 10 is coupled to an oscillator 24 generating a sequence of pulses for transmission over each angular orientation through the medium, to detect an anomaly 25.

The scattering produced by any anomaly within the field of interest will be detected by a sensing transducer 26, which may be the same transducer as the radiating transducer, or a further transducer angularly displaced therefrom. The steady state phase and amplitude of each carrier frequency within a pulse of the sequence received by the sensing transducer is determined by the detector 28.

The computer 30 provides for integration of a spectra of frequency measurements over equal phase layers, and the application of the convolution procedure to determine the value of the local departure of acoustic properties from a uniform background value. These departure properties are ultimately displayed as images in the display unit 32.

The present invention eliminates uncertainties in pulse burst ultrasound diagnostic displays by interrogating the medium under scrutiny with a sequence of relatively long pulses of assigned frequency, rather than with bursts of short pulses of a single frequency. The medium is subjected to the sequence or train of ultrasonic pulses, shown in FIG. 2a, along each path or angular orientation of transducer propagation. The interrogating ultrasonic wave T is provided with sufficient wavelength and duration to cover the entire region under scrutiny. Within the train, the carrier frequency is varied over a prescribed frequency range, from $f_1$ to $f_n$. The lowest usable frequency is that which is sufficient to provide at least two full cycles across the region under scrutiny in order to allow the phase and amplitude measurement.

The reflected or scattered signals generated by each transmitted pulse are received and analyzed. The scattered signals, shown in FIG. 2b, are analyzed, during their steady state condition $\Delta t$, for phase and amplitude shifts relative to the transmitted pulse, and this data is employed to generate the desired local physical property deviations from the uniform background value.

After completion of the transmission and analysis of scattered signals of a complete train, the transducer is reoriented, and the entire sequence repeated.

The computation of local physical property deviation from phase and amplitude changes over a prescribed frequency range is based upon the assumption of small deviations of local speed of sound from a constant speed of sound and of a small deviation of local medium characteristics from the properties of a homogeneous medium.

Figure 2A:
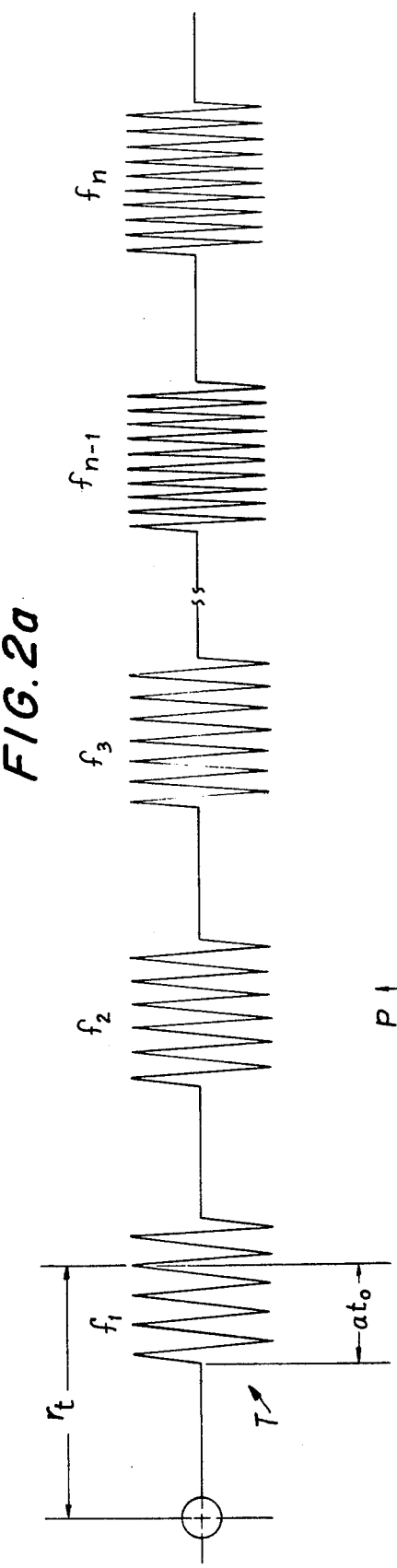
FIG. 2a is a wave form diagram of the transmitted signal.
Figure 2B:
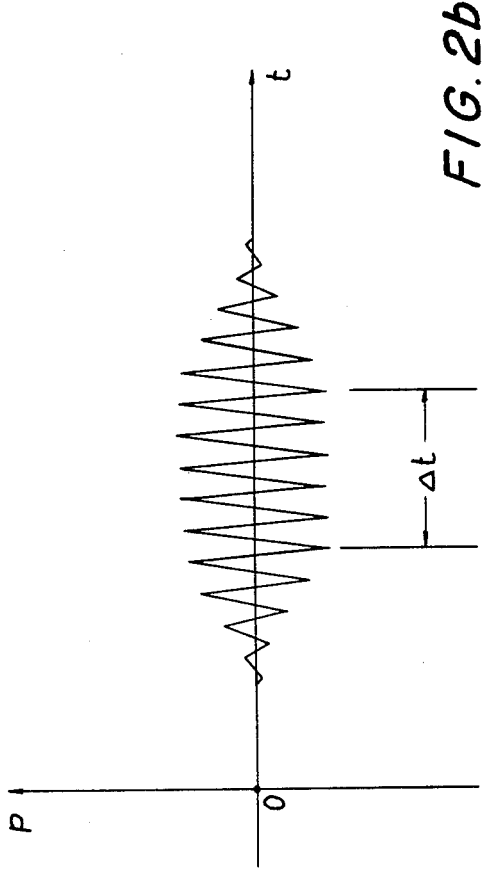
FIG. 2b is a wave form diagram of the received scattered signal.
Figure 2C:
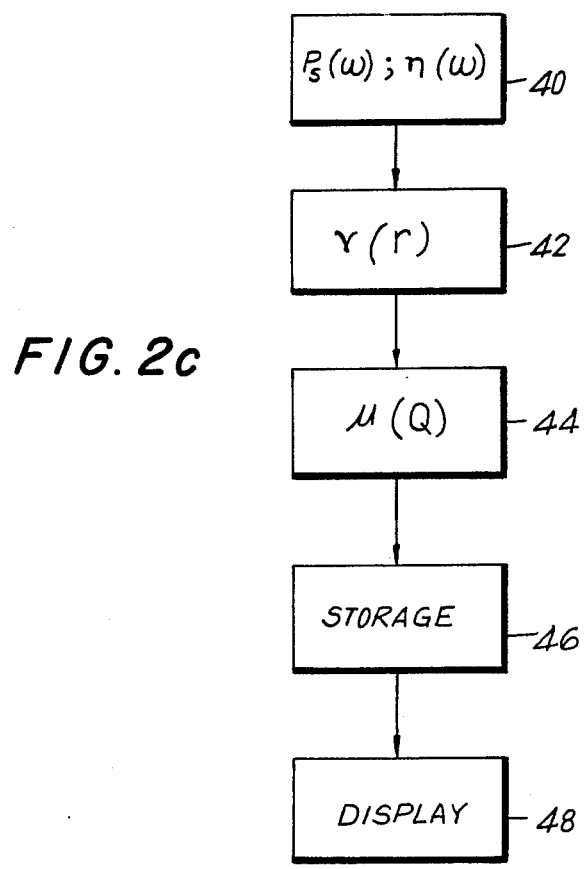
FIG. 2c is a functional flow chart of the processing steps of the present invention.

The process for detection and analysis is shown in the flow chart of FIG. 2c. The individual amplitude $P_s(\omega)$ and phase $\eta(\omega)$ measurements are derived from the measurement of each scattered pulse for all frequencies over the range from $f_1$ to $f_n$ shown as step 40. After each frequency signal is transmitted, the received scattered signal is analyzed for amplitude change and phase shift with respect to reference values, and a signal $\gamma(r)$ is derived as shown in box 42. The application of a mathematical interaction model, in box 42, to the frequency and phase data derived from the individual readings, provides the $\gamma(r)$ signal which represents physical properties integrated over equal phase layers. Application of a three dimensional convolution, box 44, to the $\gamma(r)$ signal provides the signal $\mu(Q)$, representing at each point Q the local values of physical properties relative to the uniform background medium. Upon completion of the measurements over an entire frequency spectrum at each position of the transducer, the transducer is reoriented to a new position and the sequence repeated. Individual data representing a single orientation is stored in a computer memory, box 46, and later retrieved for appropriate display, box 48. The orientation can be purely rotational, about a fixed transverse plane, thus providing a display of a transverse section of the medium 16, or both orbital and rotational, thereby providing a three dimensional model of the scanned medium.

Figure 2D:
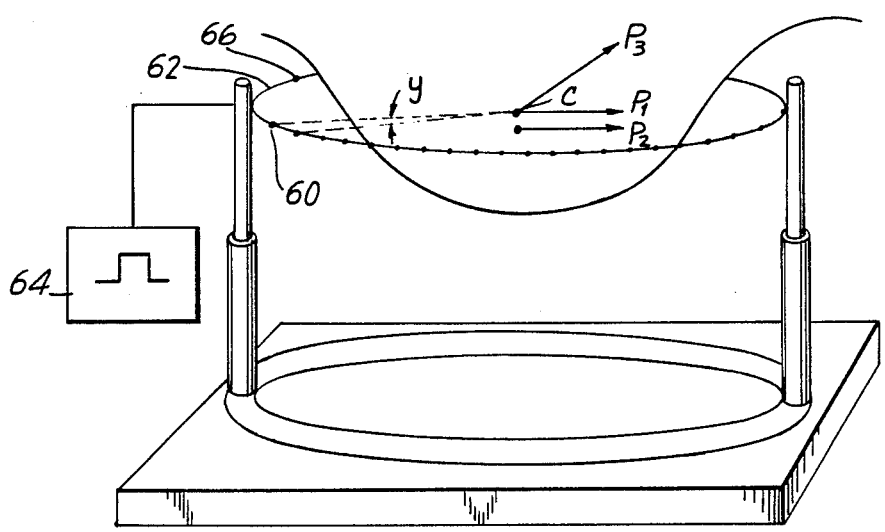
FIG. 2d is a perspective schematic illustrating the scanning geometry employed by the present invention.

It will be understood that the transducers 10 may be arranged as a plurality of sequenced transmitters, each with appropriate fixed frequency and assigned angular orientations. Thus, as shown in FIG. 2d, the transmitting transducers 60 are fixed positioned at displaced angular orientations y along a single track 62 around the medium to be scanned, about a center C. Each transducer is a crystal oscillating at one of the frequencies $f_1 \ldots f_n$. The track 62 surrounds the object being scanned. Each crystal is successively activated by a pulse source 64 for producing the signal shown in FIG. 2a. The computer 30 collects data received as scattered after each respective crystal transmits and assigns the data to a storage location corresponding to the angular orientation of each individual crystal. The entire crystal set along a track is sequentially pulsed in a fixed track orientation, and then the track 62 is rotated by one angular increment y, and the entire operation repeated. In this manner, all angular orientations are ultimately pulsed with the entire frequency spectra over the transverse plane $P_1$. The entire track can be shifted vertically to provide a further set of measurements along a second, parallel, transverse plane $P_2$. Alternatively, the track can be skewed to provide a set of data along a family of planes parallel to $P_3$. The receiving transducer 66 may be located anywhere along the track 62, as long as its position remains constant with respect to the track.

The derivation of local values may be shown by a mathematical analysis.

Figure 3A:
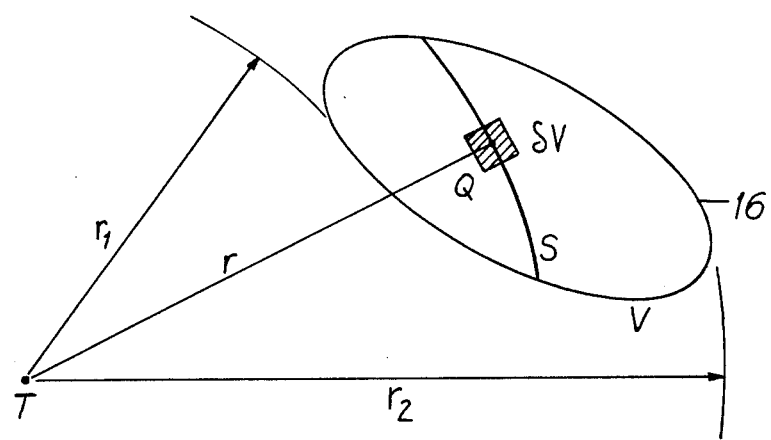
FIGS. 3a and 3b are geometric designations explaining the mathematical reconstruction of the present invention.

Assume a point transducer located at T, as indicated in FIG. 3a, which is used to transmit and receive an acoustic wave in a uniform and non-dispersive medium. In the absence of attenuation losses, a constant amplitude and constant frequency pressure wave generated at T propagates in the area 16 medium as a spherical wave:

$$p = (\Psi/r)e^{i\omega(t-r/a)} \quad\quad 1$$

where $\omega$ is the angular frequency, a is the speed of sound and r is the distance from T. $\Psi$ is an arbitrary constant. As shown in FIG. 3a, assume at a point Q an anomaly of volume $\delta V$, whose physical dimensions are small compared to the wavelength of the incident acoustic wave. On the other hand the wavelength is assumed to be small compared to the distance r between Q and T. If the acoustic properties of the medium within $\delta V$ are different from those of the surrounding medium, a fraction of the incident acoustic wave is scattered by $\delta V$. This difference between local and surrounding properties is assumed to be small. Assume also a linear sound tissue interaction process. Then the scattered pressure wave received at T can be written in the form:

$$\delta P_s = \psi \Phi(i\omega) \mu(Q) \frac{e^{i\omega(t-\frac{2r}{a})}}{r^2} \delta V \quad\quad 2$$

where $\mu$ is a linear function of the differences between local and surrounding physical properties which contribute to the scattering process and $\Phi(i\omega)$ is a function of the frequency which depends on the scattering cross-section of each element of the volume $\delta V$. The value $\Phi$ usually increases rather rapidly with the frequency in the large wavelength limit. The actual values of $\Phi$ and $\mu$ are determined by a detailed analysis of the scattering process.

The analysis of the simplest interaction process may be based on the assumptions of a uniform, isotropic, non-dispersive and lossless medium where the incident acoustic wave is partially scattered by a sphere whose radius is very small compared to the minimum wave length of the acoustic signal.

Figure 3B:
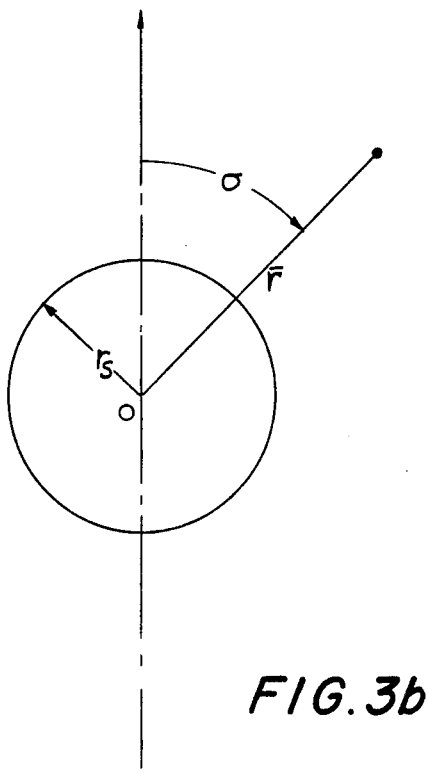

The complex pressure amplitude P and velocity vector $\vec{\omega}$ of an acoustic wave of angular frequency $\omega$ satisfy the equations $$\begin{cases} \nabla^2 P + \frac{\omega^2}{a^2} P = 0 \\ \vec{U} = \frac{1}{i\omega\rho} \nabla P \end{cases} \quad 3$$

where $a$ and $\rho$ are the speed of sound and the density of the uniform medium, respectively. Assume a spherical frame of reference as shown in FIG. 3b, where $\sigma$ is the angle between the radial coordinate $\vec{r}$ and vector $\vec{n}$. A solution of the first equation of system 3, representing a plane wave which propagates in the direction of vector n, can be written in the form:

$$P_i = A_o \sqrt{\frac{2}{\pi k_o \vec{r}}} \sum_{n=0}^{\infty} (2n+1) i^n P_n(\cos\sigma) J_{n+\frac{1}{2}}(k_o \vec{r}) \quad 4$$

where $P_n(\cos\sigma)$ and $J_{n+\frac{1}{2}}(k_o \vec{r})$ are the Legendre's functions and the Bessel functions of the first kind respectively and $$k_o = \omega/a_o \quad 5$$

$a_o$ being the speed of sound in the uniform medium. $A_o$ is an arbitrary constant.

Assume now a spherical body of radius $r_s$ immersed in the uniform medium with its center at 0. The radius of the sphere satisfies the condition $$2r_s << 2\pi a_o/\omega \quad 6$$

and the medium within the sphere is characterized by a speed of sound $a$ and a density $\rho$ slightly different from the surrounding values $a_o$ and $\rho_o$.

In the limit of equation 6 the interaction of the incident wave with the sphere reduces to a spherically symmetric compression and expansion of the sphere, and the oscillating sphere generates an outgoing spherical sound wave in the surrounding medium whose complex pressure amplitude is $$P_{sc} = A_1 \sqrt{\frac{2}{\pi k_o \vec{r}}} H_{\frac{1}{2}}^{(2)}(k_o \vec{r}) \quad 7$$

where $H_{\frac{1}{2}}^{(2)}$ is the Hankel function and $A_1$ is a constant determined by the boundary conditions at the surface of the sphere. The velocity vector of the scattered wave reduces to the radial component $U_{r,sc}$ and from equation 7 one obtains $$P_{sc} \sim \frac{2iA_1}{\pi k_o} \frac{e^{ik_o \vec{r}}}{\vec{r}} \quad 8$$

-continued $$U_{r,sc} \sim \frac{2iA_1}{\pi\omega\rho_o} \left(1 + \frac{1}{ik_o\vec{r}}\right) \frac{e^{ik_o\vec{r}}}{\vec{r}}$$

The spherically symmetric solution of Equation 3 yields inside the sphere:

$$P_{int} \sim A_2 \sqrt{\frac{2}{\pi k \vec{r}}} J_{\frac{1}{2}}(k\vec{r}) \quad 9$$

where $A_2$ is a second integration constant. Thus in the limit of 6 one obtains inside the sphere $$P_{int} \sim 2A_2/\pi \quad 10$$

and $$U_{r,int} \sim (2A_2/\pi)(i\omega/3\rho a^2)\vec{r} \quad 11$$

from equations 10, 11 one has $$U_{r,int}/P_{int} \sim (i\omega/3)c\vec{r} \quad 12$$

where $$c = 1/\rho a^2 \quad 13$$

is the coefficient of compressibility of the medium inside the sphere.

The boundary conditions at $r=r_s$ of continuity of pressure and velocity across the surface of the sphere yield the system of equations:

$$\begin{cases} -\frac{i}{k_o r_s} A_1 + A_2 = A_o \\ \frac{iA_o}{k_o^3 r_s^3} A_1 + \frac{c}{3} A_2 = \frac{c_o}{3} A_o \end{cases} \quad 14$$

where $$c_o = 1/\rho_o a_o^2 \quad 15$$

is the coefficient of compressibility of the surrounding medium. The solution of the system of equations 14 yields the value of coefficient $A_1$.

$$A_1 = i/3 (k_o r_s)^3 (c/c_o - 1) A_o \quad 16$$

Thus the pressure amplitude of the scattered wave is $$P_{sc} \sim \frac{2}{3\pi} (k_o r_s)^3 A_o \left(\frac{c}{c_o} - 1\right) \frac{e^{ik_o\vec{r}}}{k_o \vec{r}} \quad 17$$

where the function $\mu$ is defined as $c/c_o - 1$ and, substituting in equations 1 and 2, the function $\Phi(i\omega)$ results in $$\omega^2/4\pi a_o^2. \quad 17A$$

$P_{sc}$ is proportional to the square of the frequency, to the volume of the sphere and to the difference between coefficient of compressibility of the sphere and coefficient of compressibility of the surrounding medium.

Equation 17 and the resulting values of $\mu$ and $\Phi$ are the result of a model of interaction where the term n=0 in expansion equation 4 is dominant. In this case, the single mechanical property of the medium represented by the coefficient of compressibility c is the parameter reconstructed from the scanning and reconstruction technique described herein. In the extreme case where the sphere of radius $r_s$ is a rigid body, a dipole mode of scattered wave is excited in this case by the $n=1$ term of expansion equation 4 and it may be the dominant mode as long as condition of equation 6 is satisfied. The complex pressure amplitude of the scattered sound wave is $$P_{sc} \approx A_{1,1} \sqrt{\frac{2}{\pi k_o \bar{r}}} H^{(2)}_{3/2}(k_o \bar{r}) \cos \sigma \qquad 18$$

with a radial component of the velocity vector $$U_{sc,r} \sim -\frac{A_{1,1}}{i\rho_o a_o} \sqrt{\frac{2}{\pi}} \left[ -\frac{2}{(k_o \bar{r})} 3/2 \, H^{(2)}_{3/2}(k_o \bar{r}) + \frac{1}{(k_o \bar{r})} H_1^{(2)}(k_o \bar{r}) \right] \cos \sigma \qquad 19$$

The boundary condition at the surface of the sphere is a zero value of the total radial component of the velocity vector, which yields the value of $A_{1,1}$ $$A_{1,1} = -(\pi/4)(k_o r_s)^3 A_o \qquad 20$$

and at a large distance from the sphere the pressure amplitude of the scattered wave is $$P_{sc} \sim -\frac{1}{2}(k_o r_s)^3 A_o \frac{e^{-ik_o \bar{r}}}{k_o \bar{r}} \cos \sigma \qquad 21$$

Thus again $P_{sc}$ is proportional to the square of the frequency and to the volume of the sphere and functions $\mu$ and $\Phi$ can be defined, where, for a rigid body $c=0$, $$\mu = -1; \; \Phi(i\omega) = (3/16)(\omega^2/a_o^2) \qquad 22$$

The dipole mode scattered by the rigid sphere described by equation 21 corresponds to an oscillation of the sphere about the equilibrium point $\bar{r}=0$, parallel to the direction of the incident wave. As indicated by Eq. 21, the amplitude of the scattered pressure wave is 0 in the plane passing through the center of the sphere and perpendicular to the direction of propagation of the incident wave.

In a more general situation of wave tissue interaction, the viscoelastic properties of the medium determine the magnitude of the modes excited by the terms of expansion 4 within the element of volume $\delta V$. The elastic properties, defined as the coefficient of compressibility c discussed above, may be derived separately from the measurement of the scattered pressure $P_{sc}$ and indicated or displayed on a numerical or other relative characteristic basis. Thus, over a complete scan, the relative elasticity of a medium to its surrounding field can be derived. This value has importance in defining physiological properties which are functions of compressibility.

To formulate the algorithm which derives the local value of $\mu$, assume now a distribution of scatterers throughout the volume V indicated in FIG. 3. In a spherical frame of reference, with the origin at T, the scattered pressure received by the transducer becomes:

$$P_s = \psi \, \Phi(i\omega) \int_{r_1}^{r_2} \gamma(r) \frac{e^{i\omega(t - \frac{2r}{a})}}{r^2} dr \qquad 23$$

where $r_1$, $r_2$ are minimum and maximum distances of points of volume V from T and $$\gamma(r) = \int_S \mu \, dS \qquad 24$$

where S is the area of the spherical surface within volume V and centered at T. Eq. 23 can be immediately generalized to the case of an arbitrary wave form of the transmitted acoustic signal where $\Psi$ becomes a function of the frequency $\omega$ and the received pressure wave scattered by volume V becomes:

$$P_s(t) = \int_{-\infty}^{+\infty} d\omega \int_{r_1}^{r_2} \psi(i\omega) \Phi(i\omega) \frac{\gamma(r)}{r^2} e^{i\omega(t - \frac{2r}{a})} dr \qquad 25$$

Assume for instance that ideally an impulse pressure wave is generated by transducer T. The impulse wave is represented by the $\delta$-function defined by:

$$\delta(t)_{t \neq 0} = 0 \qquad \int_{-\infty}^{+\infty} \delta(t)dt = 1 \qquad 26$$

In this case the complex function $\Psi(i\omega)$ reduces to:

$$\Psi(i\omega) = 1/2\pi \qquad 27$$

Furthermore if a non-dispersive medium is assumed within volume V, $\Psi(i\omega)$ reduces to a constant and Eq. 25 becomes:

$$P_s(t) = \frac{\Phi}{2\pi} \int_{r_1}^{r_2} dr \frac{\gamma(r)}{r^2} \int_{-\infty}^{+\infty} e^{i\omega(t - \frac{2r}{a})} d\omega$$

$$= \Phi \frac{a}{2} \int_{r_1}^{r_2} \frac{\gamma(r)}{r^2} \delta\left(r - \frac{at}{2}\right) dr \qquad 28$$

i.e.

$$p_s(t) = \Phi(a/2)[\gamma(r)/r^2] \qquad 29$$

Where $r = at/2$. The instantaneous value of the received pressure is proportional to the value of $\gamma$ at the distance $r = at/2$. Thus by measuring the time distribution of $p_s$ one obtains the integral value of $\mu$ over the concentric spherical surfaces within V.

In practice only a finite frequency range can be generated and received by the transducer. This means that even in the ideal situation defined above, the measurement of $p_s(t)$ does not lead to the simple separation of the contribution of each spherical layer of scatterers described by Eq. 29.

To analyze the effect of the finite frequency range, assume that the transmitted signal is ideally a rectangular pulse of constant amplitude within the time interval $t_o$, as shown in FIG. 2a. $\Psi(i\omega)$ is then:

$$\Psi(i\omega) = (1/\pi\Psi)\sin(\omega t_o/2) \qquad 30$$

Figure 4A:
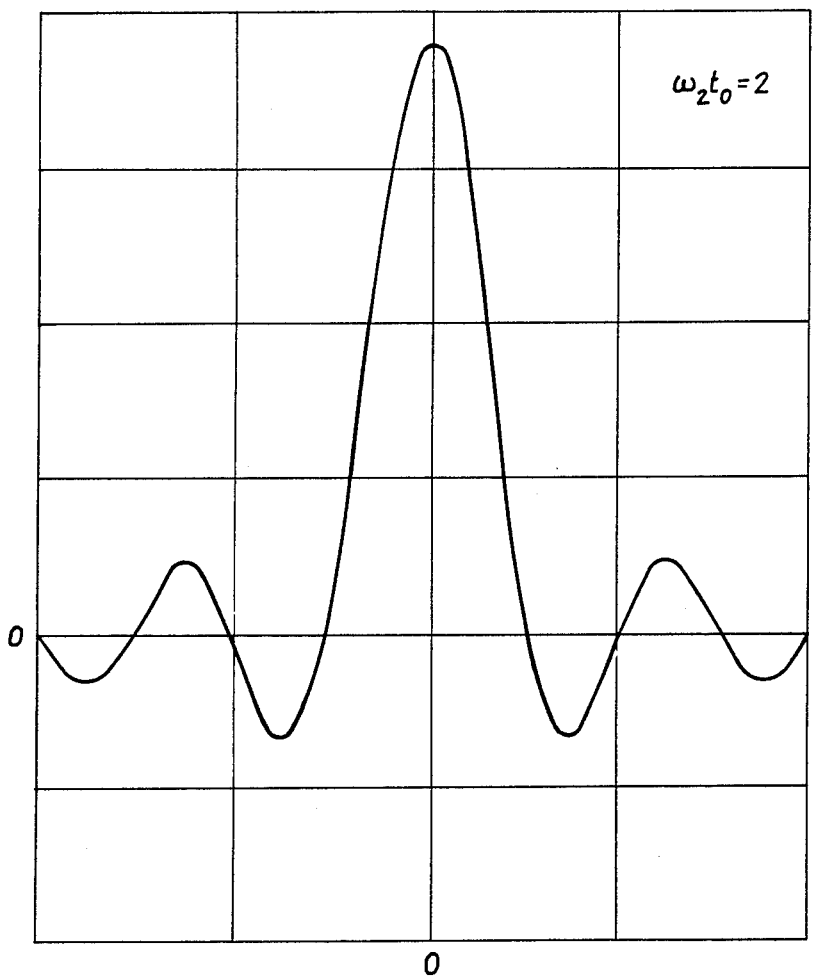
FIGS. 4a and 4b are wave forms illustrating certain response characteristics.

If the transmitted frequency lies within the ranges from a minimum value $\omega_1$ to a maximum value $\omega_2$, then $\Psi(i\omega)$ has the value in Eq. 30 within the frequency interval:

$$\omega_1 < |\omega| < \omega_2 \qquad 31$$

and $\Psi(i\omega)$ is zero outside of this range. The limited frequency range yields the value of the transmitted signal:

$$\begin{aligned} p(t) &= \frac{1}{\pi r} \int_\omega \frac{1}{\omega} \sin\left(\omega \frac{t_o}{2}\right) e^{i\omega t'} d\omega \\ &= \frac{1}{\pi r}\left\{ Si\left[\omega_2\left(t' + \frac{t_o}{2}\right)\right] - Si\left[\omega_2\left(t' - \frac{t_o}{2}\right)\right] - Si\left[\omega_1\left(t' + \frac{t_o}{2}\right)\right] + Si\left[\omega_1\left(t' - \frac{t_o}{2}\right)\right]\right\} \end{aligned} \qquad 32$$

where:

$$t' = t - r/a \qquad 33$$

where Si denotes a Sine integral. If the lower frequency cut off $\omega_1$ is much smaller than $\omega_2$, the contribution of the last two terms in Eq. 32 is negligible compared to the first two terms, for values of $|t'|$ of the order of $t_o$. An example of Eq. 32 is shown in FIG. 4 in the particular case of $\omega_1 = 0$ and $$\omega_2 t_o = 2 \qquad 34$$

The dominant values of Eq. 32 confined to the time interval of the order of $t_o$ about $t' = 0$ and the asymptotic behavior of Eq. 32 for $|\omega_2 t'| \gg 1$ is:

$$p(t) \sim (2/\omega_2 rt')\sin(\omega_2 t_o/2)\sin\omega_2 t' \quad (\omega_1 \ll \omega_2) \qquad 35$$

Thus the transmitted signal is not confined to a finite time interval and, even in the case of a non-dispersive scattering process, each element of volume contributes to the instantaneous value of the received pressure wave defined in Eq. 25. The amplitude of this asymptotic oscillation of p(t) in Eq. 35 is minimized for values of $t_o$:

$$\omega_2 t_o = 2h\pi \quad (h = 1, 2, \ldots) \qquad 36$$

Write Eq. 25 in the form:

$$\int_\omega P_s(i\omega) e^{i\omega t} d\omega = \int_{r_1}^{r_2} \frac{\gamma(r)}{r^2} F\left(r - \frac{at}{2}\right) dr \qquad 37$$

where:

$$\begin{cases} F\left(r - \frac{at}{2}\right) = \int_\omega \Psi(i\omega)\Phi(i\omega) e^{i\omega\tau} d\omega \\ \tau = t - \frac{2r}{a} \end{cases} \qquad 38$$

Based on the model of wave-tissue interaction set forth in eq. 17, let us define the function $\mu$ in Equation 24 as:

$$\mu = (c/c_o) - 1 \qquad 39$$

Function $\Phi(i\omega)$ in Equation 38 is then $$\Phi(i\omega) = \omega^2/4\pi a_o^2 \qquad 40$$

Assuming again that equation 30 defines the spectral distribution of the transmitted wave, within the frequency interval of $\omega_1$ to $\omega_2$, the value in equation 38 of function F becomes:

$$F\left(r - \frac{at}{2}\right) = \frac{1}{4\pi^2 a_o^2} \frac{\partial}{\partial \tau} \int_{\omega_1}^{\omega_2} \left[\cos\omega\left(\tau + \frac{t_o}{2}\right) - \cos\omega\left(\tau - \frac{t_o}{2}\right)\right] d\omega \qquad 41$$

and in the particular case of $\omega_1 = 0$, $F(r - at/2)$ reduces to $$F\left(r - \frac{at}{2}\right) = \frac{\omega_2^2}{4\pi^2 a_o^2}\left[\frac{\cos\omega_2\left(\tau + \frac{t_o}{2}\right)}{\omega_2\left(\tau + \frac{t_o}{2}\right)} - \frac{\sin\omega_2\left(\tau + \frac{t_o}{2}\right)}{\omega_2^2\left(\tau + \frac{t_o}{2}\right)^2} - \frac{\cos\omega_2\left(\tau - \frac{t_o}{2}\right)}{\omega_2\left(\tau - \frac{t_o}{2}\right)} + \frac{\sin\omega_2\left(\tau - \frac{t_o}{2}\right)}{\omega_2^2\left(\tau - \frac{t_o}{2}\right)^2}\right] \qquad 42$$

The asymptotic limit of F for $|\omega_2 \tau| \gg 1$ is $$F\left(r - \frac{at}{2}\right) \sim \frac{\omega_2^2}{2\pi^2 a_o^2}\left[\frac{1}{\omega_2 \tau}\sin\left(\omega_2 \frac{t_o}{2}\right)\sin\omega_2 \tau\right] \qquad 43$$

Figure 4B:
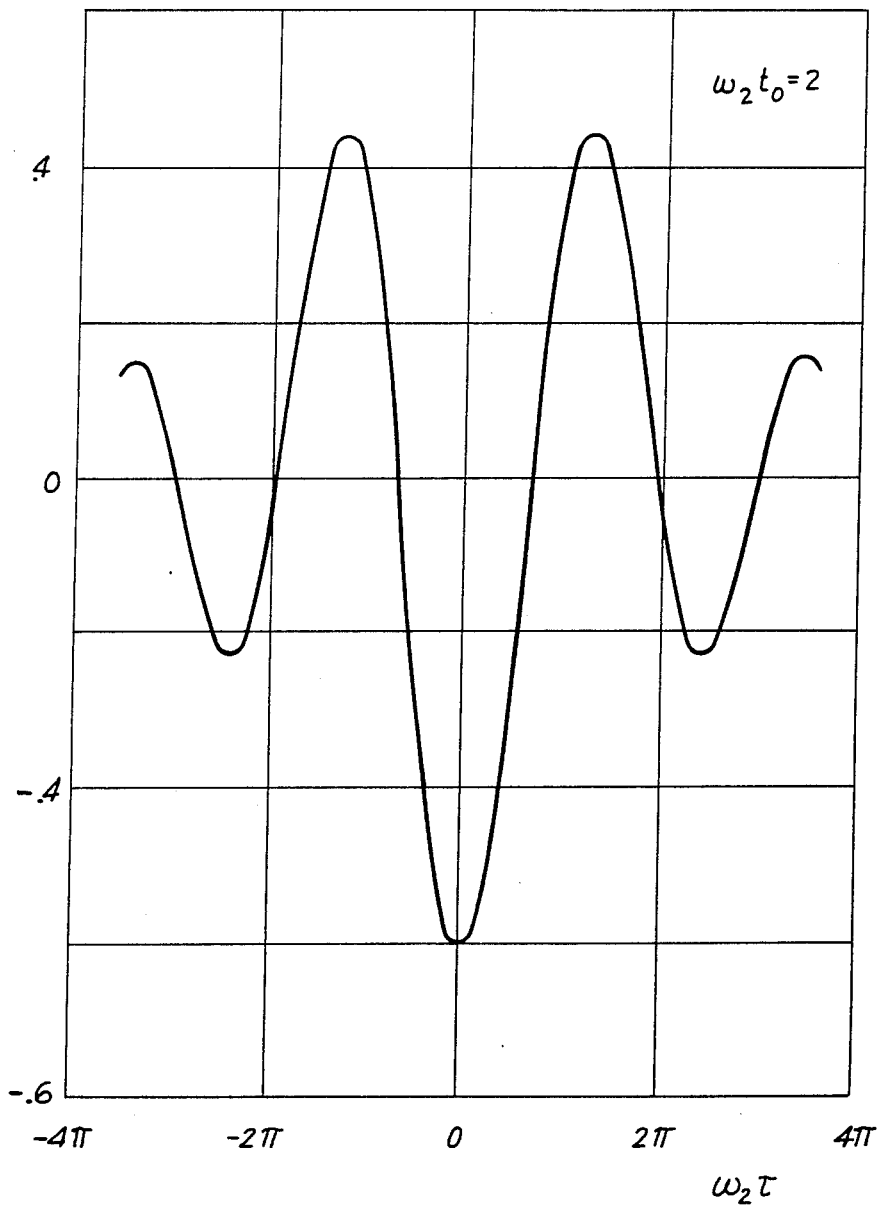

A plot of equation 42 in the particular case of $\omega_2 t_o = 2$ is shown in FIG. 4b.

Assume that the amplitude and phase of the complex quantity $P_s(i\omega)$ are measured at each value of the angular frequency $\omega$ within interval of Eq. 31. Then the value of the right hand side of equation 37 can be computed at each value of time t, and the main contribution to the integral is bound to occur in the radial interval where F attains a dominant value. For a slowly changing function $\Phi(i\omega)$, and with $\Psi(i\omega)$ defined by Eq. 30, the main contribution to the right hand side integral in the Eq. 37 is given by the scattering generated in the neighborhood of the spherical layer:

$$r = at/2 \qquad 44$$

For Eq. 37, a system of equations is obtained which for all values of t within a suitably long time interval, and can then be solved to compute the radial distribution of $\gamma(r)$. To compute, in particular, the average values of $\gamma$ over radial intervals $r_o$ sufficiently small compared to $\pi a/2\omega_2$ and this becomes:

$$j = +\frac{r_2 - \bar{r}}{r_0} \sum_{j=-\frac{\bar{r}-r_1}{r_0}} F_j \frac{\gamma(\bar{r}+jr_0)}{(\bar{r}+jr_0)^2} \sim \int_\omega P_s(i\omega)e^{i\omega \bar{t}}d\omega \quad 45$$

where:

$$r = at/2 \quad 46$$

and the system of Eqs. 45 written at radial intervals:

$$r_{h+1} - r_h = r_0 \quad 47$$

can then be solved to compute $\gamma$.

With values of $\gamma$ over equal phase layers, a convolution approach is used to compute the values of $\mu$ from the values of the surface integrals $\gamma$ which have been obtained in the solution of the system of Eq. 45. Assume first that the distance of transducer T from each point of volume V is large enough such that the curvature of S can be neglected with the radial sampling interval $r_0$. Thus the values of $\gamma$ are assumed to be known on plane surfaces confined within volume V. Assume also that the measurements of amplitude and phase of $P_s(i\omega)$ (Eq. 45) are performed for all possible positions of transducer T over half a spherical surface with center 0 within V. Thus at each point of volume V the values of $\gamma$ are known for all possible orientations of surfaces S framing through the same point. Select a rectangular frame of reference x, y, z with the origin at 0 and let n be a vector perpendicular to a surface S. The position of S is identified in spherical coordinates by its distance d from 0, the angle $\nu$ between $\vec{n}$ and the z axis, and the angle $\chi$ between the projection of $\vec{n}$ on the plane x, y and the x axis as shown in FIG. 5.

Let us reconstruct the value of $\mu$ at a point Q of spherical coordinates r, $\theta$, $\alpha$ as indicated in FIG. 6. Consider the plane which contains point Q and the axis z, and let C be a circle in this plane whose diameter is r and which passes through Q and the origin 0 of the system of coordinates. The value of $\mu$ at Q is given by:

$$\mu(r, \theta, \alpha) = \frac{1}{4\pi r_0} \int_0^\pi g[r|\cos(\psi - \theta)|, \psi] d\psi \quad 48$$

where:

$$r|\cos(\psi - \theta)|, \psi \quad 49$$

are the polar coordinates of point Q, on circle C as shown in FIG. 6 and $$g[r|\cos(\psi - \theta)|, \psi] = \sum_{-\infty}^{+\infty} \Gamma_j \kappa[r|\cos(\psi - \theta)| + jr_0, \psi] \quad 50$$

where $\kappa$ is the integral:

$$k = \int_{-\infty}^{+\infty} \mu \, d\zeta \quad 51$$

computed at point:

$$r|\cos(\psi - \theta)| + ir_0, \psi, \alpha \quad 52$$

along the straight line $\zeta$ which belongs to the plane of circle C and is perpendicular to the line $OQ_1$. The convolution multipliers $\Gamma_j$ in Eq. 50 are defined by:

$$\Gamma_0 = 2M_0 \quad 53$$

$$\Gamma_1 = \frac{1}{\theta_{1,1}}(M_1 - M_0)$$

$$\Gamma_2 = \frac{1}{2\theta_{2,1}}(M_2 - M_0 - \theta_{1,2}\Gamma_1)$$

$$\cdots \cdots$$

$$\Gamma_j = \Gamma_j = \Gamma_{-j} = \frac{1}{j\theta_{j,1}}[M_j - M_0 - (j-1)\theta_{j-1,2}\Gamma_{j-1} - \cdots - \theta_{1,j}\Gamma_1]$$

where:

$$M_j = e^{-\frac{j^2}{\lambda^2}} - e^{-\frac{(j+1)^2}{\lambda^2}} \quad 54$$

and the parameters $\theta_{h,k}$ are:

$$\theta_{h,k} = \frac{1}{h}\left[\sqrt{(h+k)^2 - h^2} - \sqrt{(h+k-1)^2 - h^2}\right] \quad 55$$

$\lambda$ is an arbitrary parameter, which basically defines the number of sampling intervals $r_0$ over which the value of $\mu$ is averaged in the image reconstruction.

FIG. 6 shows a circle $C_1$ of diameter $r|\cos(\psi-\theta)|$ which passes through 0 and $Q_1$ and belongs to a plane perpendicular to the plane of circle C. As $Q_1$ moves on C in the integral of Eq. 48, circle $C_1$ describes a sphere of diameter r which passes through 0 and Q. The values of $\kappa$ in Eg. 51 can be obtained from the values of $\gamma$ computed over the surfaces S which are perpendicular to the plane of circle $C_1$. Call $\psi$ the angle between $OQ_1$ and the vector $\vec{n}$ perpendicular to S. The family of planes perpendicular to $\vec{n}$ is defined by their distance d from 0:

$$d = [r|\cos(\psi-\theta)| + ir_0]\cos\phi + jr_0 \quad 56$$

and the angle $\nu$ between $\vec{n}$ and the axis z, as indicated in FIG. 7, and the angle $\chi$ between the projection of $\vec{n}$ on the plane $z=0$ and the axis x. Angles $\nu$ and $\chi$ are given by:

$$\begin{cases} \cos \nu = \cos \phi \sin\psi \\ \sin(\alpha - \chi) = \dfrac{\sin \phi}{\sqrt{1 - \cos^2\phi \sin^2\psi}} \end{cases} \quad 57$$

The value of the integral Eq. 51 at a point of coordinates Eq. 52 is given by:

$$\kappa = \frac{1}{4\pi r_0} \int_0^\pi g'\{[r|\cos(\psi - \theta)| + ir_0]\cos\phi, \nu, \chi\}d\phi \quad 58$$

where:

$$g'\{[r|\cos(\psi - \theta)| + ir_0]\cos\phi, \nu, \chi\} = \quad 59$$
$$\sum_{-\infty}^{+\infty} \Gamma_j \gamma\{[r|\cos(\psi - \theta)| + ir_0]\cos\phi + jr_0, \nu, \chi\}$$

Thus the equation which provides $\mu$ from the value of $\gamma$ is:

$$\mu(r,\theta,\alpha) = \frac{1}{16\pi^2 r_o^2} \int_o^\pi d\psi \int_o^\pi d\phi \sum_{i,j} \Gamma_{i,j} \quad (60)$$

$$\gamma\{[r|\cos(\psi - \theta)| + ir_o]\cos\phi + jr_o, \nu, \chi\}$$

where:

$$\Gamma_{i,j} = \Gamma_i \Gamma_j \quad (61)$$

Eq. 60 can be written again in the form:

$$\mu(r,\theta,\alpha) = \frac{1}{16\pi^2 r_o^2} \int_o^\pi d\psi \int_o^\pi d\phi \sum_{i,j} \Gamma_{i,j} \gamma [r\cos\beta + r_o(j + i\cos\phi), \nu, \chi] \quad (62)$$

where:

$$\cos\beta = \cos\phi \cos(\psi - \theta) \quad (63)$$

$\beta$ being the angle between n and 0Q.

Eq. 62 represents the algorithm used for the reconstruction of the values of $\mu$. The individual $\mu$ values thereby obtained are assigned specific storage locations corresponding to this orientation in computer memory, and are retrievable in accordance with their orientation to display the composite of $\mu$ values in accordance with standard ultrasound and computer aided tomographic reconstruction techniques.

The frequency range covered by the train of pulses determines the spatial resolution of the anomalies under scrutiny. Homogeneity, in the present context, refers to a uniformity sufficient to prevent any propagated wave front from being disturbed beyond the spatial resolution of the system. As a practical example, the frequency range of from 0.01 megahertz to 1.0 megahertz, in steps of 0.01 megahertz is a practical illustration of a workable system. Assuming $\omega_2 t_o = 2$, as in FIG. 4b, a maximum frequency of 1 megahertz would allow a spatial resolution of the order of 1 millimeter.

Since the minimum frequency is 10 kilohertz, and the period of a 10 kilohertz signal is 100 microseconds, and since at least two cycles are desirable for meaningful information, the minimum pulse length at the lower frequency of approximately 300 microseconds would be sufficient. Pulse separation of approximately another 600 microseconds, allowing time for scatter reflections, establishes the overall scan length for each pulse train. As data is accumulated from the computer, each category of data is assigned a specific location corresponding to a particular orientation. The data may also be assigned a gray scale value, and all gray scale values corresponding to a particular orientation stored in a memory with appropriate computer flags. On display, reconstruction is a function of retrieving flagged data corresponding to a particular orientation and reconstructing the orientation in known manner to display a planar cross-section definable by a single array within a common plane of multiple orientation.

The foregoing technique provides for certain specific advantages not evident from prior art techniques. The use of a plurality of transmissions over a single orientation allows the use of data processing to eliminate anomalies which do not appear along similar orientation lines. Thus, if an anomaly resulting from acoustic interference over a single transmitted frequency of the series of transmitted frequencies should appear, for example, along the 15 kilocycle reflected signal path, and this anomaly does not appear along subsequent different frequency transmissions along that same common path, software may be designed so that this particular anomaly is ignored. As a result, the only anomaly which will be reconstructed is that anomaly which reappears consistently along the entire range of frequencies for a single orientation. By utilizing multiple frequency transmission bursts of relatively long duration pulses, anomalies normally present which are caused by interference with acoustic wave fronts in prior art systems will not appear in the display of the present invention.

What is claimed is:

1. An ultrasonic scanner for scanning a medium for anomalies scattering acoustic waves, comprising ultrasonic transducing means positioned within scanning range of said medium, ultrasonic transmitting means coupled to said transducing means for providing a train of pulsed ultrasonic carrier signals, each pulsed carrier signal of said train having a constant and unique frequency, said train of pulsed carrier signals together covering a range of frequencies, said transducing means oriented to propagate said train along a path through said medium, means for repeatedly repositioning said transducing means for propagating further trains along a plurality of different paths through said medium, said plurality of different paths together defining a planar cross-section, means coupled to said transducing means and responsive to the steady state phase and amplitude of the received signal to thereby define the total scatter characteristic within said planar cross-section, means for calculating, from said scatter characteristic, a plurality of point characteristics of the acoustic property corresponding to said scatter characteristic, and means for comparing each of said point characteristics with respect to one another for said anomalies.

2. The apparatus of claim 1 wherein said transducing means includes a transmitting transducer radially displaced from a receiving transducer.

3. The apparatus of claim 1 wherein said scanner further includes a display means, means for assigning gray scale values to each of said point characteristics, and means for displaying said gray scale values on said display means for providing a visual indication of said anomalies.

4. The ultrasonic scanner of claim 1 wherein said means for calculating comprises means for reconstructing anomalies detected at a single orientation that are consistent with other anomalies detected at said orientation.

5. The ultrasonic scanner of claim 1 wherein said scanner is adapted for scanning biological tissue.

6. The ultrasonic scanner of claim 1 wherein said ultrasonic transducing means is comprised of a plurality of elements positioned to direct ultrasonic waves and receive the ultrasonic waves from said medium with different orientations, and at different ultrasonic frequencies, and means for sequentialy energizing said elements to transmit ultrasonic wave signals at their respective frequency.

7. An ultrasonic scanner for scanning a medium for anomalies and providing a characteristic representation of relative compressibility of said anomaly, comprising means for ultrasonically transmitting a sequence of frequency displaced time displaced trains of pulses along a single orientation through said medium, means responsive to scattering of said pulses for producing an electrical signal proportional to the square of the frequency, the volume of the anomaly and the difference between the coefficient of compressibility of the anomaly and coefficient of compressibility of the surrounding medium, means for repeatedly reorienting said scanner and repeating said ultrasonic transmission about a plurality of orientations through said medium, said means for producing an electrical signal thereby deriving a plurality of said electrical signals corresponding to each orientation, means coupled to said means for producing an electrical signal for analyzing each said signal and deriving therefrom the component thereof representative of compressibility of said anomaly, means for reconstructing from said plurality of electrical signals a composite of said anomaly on a relative compressibility scale, and means for displaying said composite.

8. The scanner of claim 7 wherein said ultrasonic transmitting means comprises a transmitting transducer radially displaced from a receiving transducer, said receiving transducer including said means responsive to said scattering.

9. The apparatus of claim 7 wherein said scanner further includes a display means, means for assigning gray scale values to each of said point characteristics, and means for displaying said gray scale values on said display means for providing a visual indication of said anomalies.

10. The scanner of claim 7, wherein said sequence comprises, for each orientation, a plurality of time displaced frequency pulses, each of said pulses being of constant frequency over at least two cycles, each of said pulses being frequency displaced relative to both preceding and succeeding pulses adjacent thereto.

11. A method of ultrasonically scanning a medium for anomalistic conditions, and deriving therefrom a plurality of individual characteristics representative of said conditions, comprising ultrasonically transducing a plurality of frequency and time displaced train of pulses along a first orientation with respect to said medium, transducing all scatterers produced in response to the propagation of said train, and producing a data signal in response thereto, reorienting said scanner so as to transduce a second plurality of frequency and time displaced train of pulses along a further orientation path to derive a further data signal, said reorientation continuing and further data signals derived until said medium is scanned over a desired area, applying all of said data signals to a model of interaction for deriving therefrom individual data values representing the total values of absorption over radial intervals, applying a convolutional transformation to said data values to derive therefrom local values of absorption relative to surrounding background absorption, and reconstructing said local values with respect to their orientations for providing a representative model of said anomalistic conditions.

12. The method of claim 11, wherein said reconstructing further includes assigning gray scale values to each of said derived local values and displaying said gray scale values in accordance with said representative model.

13. The method of claim 11 wherein said step to reconstructing comprises reconstructing said local values with respect to said orientations only for anomalistic conditions consistent at the respective orientation.

14. The method of claim 11 wherein said step of ultrasonically transducing comprises ultrasonically transducing a plurality of frequency and time display train of pulses along a first orientation with respect to biological tissues.

* * * * *

UNITED STATES PATENT AND TRADEMARK OFFICE
CERTIFICATE OF CORRECTION

PATENT NO. : 4,322,974
DATED : April 6, 1982
INVENTOR(S) : Manlio Abele, et al.

It is certified that error appears in the above—identified patent and that said Letters Patent is hereby corrected as shown below:

Col. 5, line 10, delete "$\vec{w}$" and insert -- $\vec{a}$ --.

Col. 13, line 22, delete "n" and insert -- $\vec{n}$ --.

Col. 14, line 58, delete "sequentialy" and insert -- sequentially --.

Signed and Sealed this

*Eighth* Day of *November 1983*

[SEAL]

*Attest:*

GERALD J. MOSSINGHOFF

*Attesting Officer*  *Commissioner of Patents and Trademarks*

UNITED STATES PATENT AND TRADEMARK OFFICE
CERTIFICATE OF CORRECTION

PATENT NO. : 4,322,974

DATED : April 6, 1982

INVENTOR(S) : Manlio Abele et al.

It is certified that error appears in the above—identified patent and that said Letters Patent is hereby corrected as shown below:

Col. 1, line 40, change "as" to --is--.
Col. 4, equation 2, change "$\psi$" to --$\Psi$--.
Col. 7, line 9, insert --the-- before "condition".
Col. 8, equations 23 and 25, change "$\psi$" to --$\Psi$--.
Col. 9, equation 30, change "$\Upsilon$" (second occurrence) to --$\omega$--.
Col. 9, equation 32, change "to" to --$t_0$-- (five occurrences).
Col. 9, equation 38, change "$\psi$" to --$\Psi$--.
Col. 11, equation 45, change "$e^{i\omega\frac{t}{2}}$" to --$e^{i\omega\bar{t}}$--.
Col. 11, equation 51, change "k" to --$\mathcal{K}$--.
Col. 14, line 64, change "sequence" to --train--.
Col. 14, line 65, delete "trains of".
Col. 16, line 1, change "plu-" to --first--.
Col. 16, line 2, change "rality" to --train-- and delete "train of".
Col. 16, line 7, change "plurality" to --train--.
Col. 16, line 8, delete "train of".
Col. 16, line 26, change "to" to --of--.
Col. 16, line 32, change "plurality" to --train-- and change "display train of" to --displaced--.

Signed and Sealed this

Fourth Day of September 1984

[SEAL]

Attest:

GERALD J. MOSSINGHOFF

Attesting Officer

Commissioner of Patents and Trademarks